Feb. 7, 1950  W. P. McCALLICK ET AL  2,496,737
FLUSH TYPE DOOR HANDLE
Filed Sept. 4, 1947

Inventor
William P. McCallick
Ygnacio L. Sanchez

By Clarence A. O'Brien
and Harvey B. Jacobson
Attorneys

Patented Feb. 7, 1950

2,496,737

UNITED STATES PATENT OFFICE 2,496,737

FLUSH TYPE DOOR HANDLE

William P. McCallick and Ygnacio L. Sanchez, Los Angeles, Calif.

Application September 4, 1947, Serial No. 772,030

5 Claims. (Cl. 292—1)

1

This invention relates to improvements in door handles and more particularly door handles for vehicles.

An object of the invention is to provide an improved door handle for vehicles which will be normally held in retracted or concealed position extending flush with the outer surface of a door when the same is not in use.

Another object of the invention is to provide an improved door handle for automobile doors and the like including a normally retracted tubular handle shank and a push button operated releasing latch member disposed axially within said shank, whereby the door handle may be projected outwardly for operating the door latch mechanism when said push button is pushed inwardly.

A further object of the invention is to provide an improved door handle for automobile doors and the like including a normally retracted tubular handle shank and a push button operated releasing latch member disposed axially within said shank, and a projecting spring disposed at the inner end of said shank for resiliently projecting said handle and hollow shank outwardly beyond the outer surface of the door when said push button releasing latch member is pushed inwardly.

Another object of the invention is to provide an improved door handle construction which will be highly efficient in operation, and relatively inexpensive to manufacture and produce.

Other objects will appear as the description proceeds.

In the accompanying drawings which form a part of this application,

Like characters of reference are used throughout the following specification and the accompanying drawings to designate corresponding parts.

2

Figure 1:
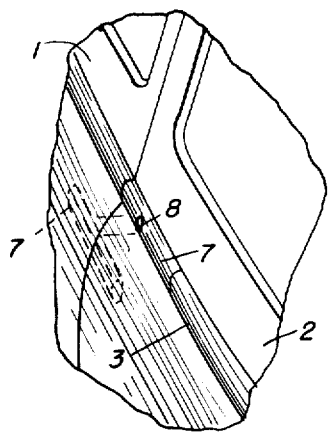
Figure 1 is a perspective view of a portion of the side of an automobile body and door showing the improved flush-type door handle in retracted position, and shown in dotted lines in extended position.
Figure 2:
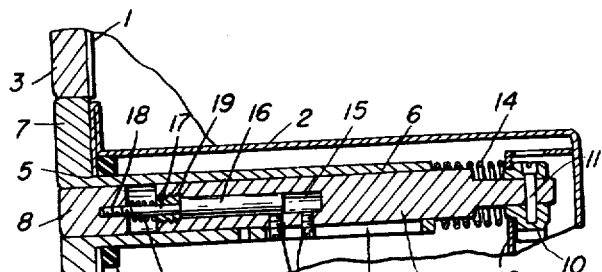
Figure 2 is a sectional view taken on the line 2—2 of Figure 5.
Figure 3:
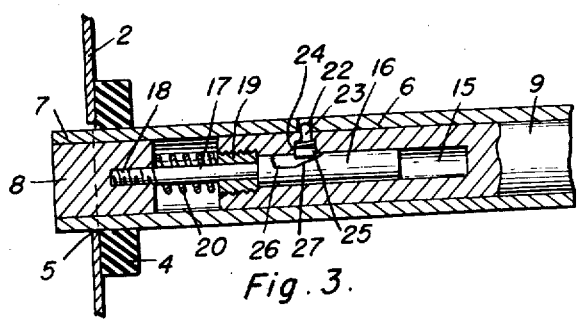
Figure 3 is a sectional view taken on the line 3—3 of Figure 5.
Figure 4:
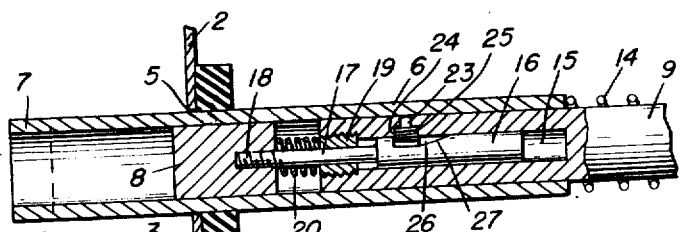
Figure 4 is a similar sectional view to that shown in Figure 3, but showing the handle shank and associated parts in extended position.
Figure 5:
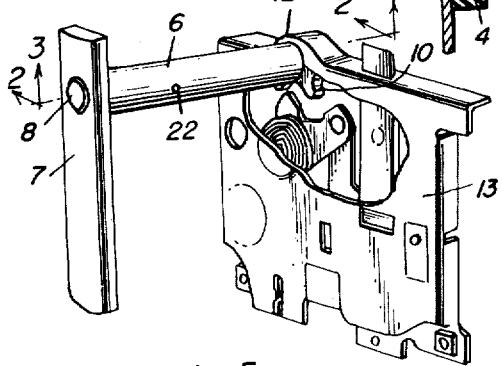
Figure 5 is a perspective view of a door lock showing the improved flush-type handle construction incorporated therein.

In carrying out the invention, there is provided and illustrated a portion of an automobile body generally designated by the reference numeral 1 and a door 2 associated therewith, together with a trim bead 3 extending around said body and door.

A rubber gasket or washer 4 is secured to the inner surface of the outside skin of the door 2 in alignment with an aperture 5 through which the hollow shank 6 extends. A transversely extending handle 7 will be formed integrally upon the outer end of said hollow shank 6, and is bored to receive the push button 8 slidably disposed in said hollow shank 6 and normally extending flush with the outer surface of said handle 7.

A door latch actuating shaft 9 is reduced at its inner end to receive the door latch actuating dog 10 and is transversely apertured to receive the locking set screw 11 for holding said dog 10 in fixed position.

The actuating dog 10 and the inner end of the latch actuating shaft 9 are anchored upon the inwardly extending wall 12 forming a part of the lock housing 13.

A coil spring 14 is disposed about the inner end of the shaft 9, having its ends engaging the inner end of the hollow shank 6 and the wall 12, respectively, for resiliently projecting said shank 6 outwardly when desired.

The outer end of the latch actuating shaft 9 is centrally and axially bored, as at 15, for slidably receiving the cylindrical actuating plug 16 whose outer end is reduced to form the rod 17 which is threaded, as at 18, upon its outer end for threading into the push button 8. A threaded bearing collar 19 is threaded into the outer end of the bore 15 and extends about the rod 17. A coil spring 20 is disposed about the rod 17 with its ends contacting the adjacent ends of said push button 8 and said collar 19.

A radially extending passage 22 is formed through the hollow shank 6 and cooperates with a locking stud 23 slidably received in the reduced outer end of a bore 24 in the wall about the axial bore 15 in the outer end of the shaft 9. The inner enlarged end of the bore 24 slidably receives the enlarged base portion of the stud 23 and includes a bearing surface between the inner wall of the axial bore 15 and the outer wall of the shaft 9. A coil spring 25 embraces the stud 23 and is biased between the enlarged base portion of the stud 23 and the bearing surface of the enlarged end of the bore 24 to resiliently urge the enlarged base portion of the stud 23 into a slot 26 provided in the actuating plug 16.

The slot 26 includes a cam surface 27 upon which the enlarged base portion of the stud 23 will ride when the hollow handle shank 6 is being released while being projected outwardly.

A pair of guide set screws 28 are supported in the latch actuating shaft 9 to extend into the longitudinal slot 29 formed through the hollow shank 6 for guiding the movement of said hollow shank 6 upon the actuating shaft 9.

From the foregoing description, it will be apparent that when it is desired to project the door handle 7 outwardly for releasing the latch and opening the automobile door 2, it will be necessary merely to depress the push button 8, thereby causing the actuating plug 16 to release the stud 23 from the passage 22, whereupon the coil spring 14 will project the handle 7 and its hollow shaft 6 outwardly into position to be operated. After the handle has been projected outwardly, a rotation of the shaft 6, by the handle 7, will cause the shaft 9 to rotate and the dog 10 will engage and urge the door latch or lock mechanism, in the housing 13, to its unlatched position.

While the preferred embodiment of the instant invention has been illustrated and described, it will be understood that it is not intended to limit the scope of the invention thereto, as many minor changes in detail of construction may be resorted to without departure from the spirit of the invention.

Having described the invention, what is claimed as new is:

1. A flush type door handle for vehicle door latches comprising a latch actuating shaft anchored at its inner end to a door, a handle, a hollow shank for said handle slidably mounted on said shaft, a push button extending through said handle slidably mounted in said hollow shank, a locking stud supported by said shaft in engagement with said shank, and means connected with said push button for releasing said locking stud from engagement with the shank.

2. A flush-type door handle for vehicle door latches comprising a latch-actuating shaft anchored at its inner end to a door, a handle and integrally formed hollow shank therefor slidably mounted on said shaft, a push button extending through said handle slidably mounted in said hollow shank, a locking stud supported by said shaft in engagement with said shank, means connected with said push button for releasing said locking stud, and resilient means for projecting said hollow shank outwardly from said door when said shank is released by said locking stud.

3. A flush-type door handle for vehicle door latches comprising a latch-actuating shaft anchored at its inner end to a door, a handle and integrally formed hollow shank therefor slidably mounted on said shaft, a push button extending through said handle slidably mounted in said hollow shank, a locking stud supported by said shaft in engagement with said shank, and an actuating plug connected with said push button having a cam surface for actuating said locking stud into engagement with said shank.

4. The combination of claim 3 and resilient means normally urging said push button into predetermined relationship with said latch actuating shaft.

5. The combination of claim 3 and a coil spring biased between said push button and said latch actuating shaft, said hollow shank being formed with a guide slot, and guide means supported by said shaft operable in said guide slot.

WILLIAM P. McCALLICK.
YGNACIO L. SANCHEZ.

REFERENCES CITED

The following references are of record in the file of this patent:

UNITED STATES PATENTS

| Number | Name | Date |
| --- | --- | --- |
| 2,120,647 | Papst | June 14, 1938 |
| 2,177,672 | Schoch | Oct. 31, 1939 |